Nov. 23, 1926.      1,607,797

J. N. MINNICH

PLACE CARD FOR GAMES

Filed April 6, 1922

Fig. 1.

| GAME | TABLE | | |
|---|---|---|---|
| 1 | 1x | | |
| 2 | 2 | | |
| 3 | 5x | | |
| 4 | 4 | | |
| 5 | 3x | | |
| 6 | 6 | | |
| 7 | 5 | | |
| 8 | 4x | | |
| 9 | 2 | | |
| 10 | 4x | | |
| 11 | 3 | | |
| 12 | 6x | | |

Fig. 2.

| GAME | TABLE | |
|---|---|---|
| 1 | 1x | |
| 2 | 3 | |
| 3 | 4x | |
| 4 | 2 | |
| 5 | 6x | |
| 6 | 2 | |
| 7 | 3x | |
| 8 | 1 | |
| 9 | 4x | |
| 10 | 5 | |
| 11 | 2x | |
| 12 | 6 | |

Fig. 5.

| GAME | TABLE | COUPLE NO. 1 | |
|---|---|---|---|
| 1 | 13 | | |
| 2 | 12 | | |
| 3 | 10 | | |
| 4 | 8 | | |
| 5 | 6 | | |
| 6 | 4 | | |
| 7 | 2 | | |
| 8 | 1 | | |
| 9 | 3 | | |
| 10 | 5 | | |
| 11 | 7 | | |
| 12 | 9 | | |

Fig. 3.

| GAME | TABLE |
|---|---|
| 1 | 1 |
| 2 | 4x |
| 3 | 3 |
| 4 | 5x |
| 5 | 2 |
| 6 | 3x |
| 7 | 1 |
| 8 | 4x |
| 9 | 6 |
| 10 | 5x |
| 11 | 6 |
| 12 | 5x |

Fig. 4.

| GAME | TABLE |
|---|---|
| 1 | 1 |
| 2 | 6x |
| 3 | 2 |
| 4 | 3x |
| 5 | 5 |
| 6 | 4x |
| 7 | 6x |
| 8 | 1 |
| 9 | 2x |
| 10 | 6 |
| 11 | 4x |
| 12 | 5 |

LEGEND

CROSS MARK INDICATES RED NUMERAL

Inventor
John N. Minnich
By Watson E. Coleman
Attorney

Patented Nov. 23, 1926.

1,607,797

UNITED STATES PATENT OFFICE.

JOHN N. MINNICH, OF BEDFORD, PENNSYLVANIA.

PLACE CARD FOR GAMES.

Application filed April 6, 1922. Serial No. 550,156.

This invention relates to place cards for games and has for an important object thereof the provision of a place card which may be arranged in sets for any desired number of tables and games and which provides means for simultaneously designating the table at which a particular game is to be played and the players who are to act as partners at this table.

A further and more specific object of the invention is to provide a place card having arranged thereon two sets of numbers or other indicia, one representing the game to be played and the other the table at which the game is to be played, the table numbers opposite the game to be played being duplicated upon a number of cards equal to the number of persons who are to play at the table and having identifying characteristics whereby the persons who are to play as partners are designated.

These and other objects I attain by the construction shown in the accompanying drawings, wherein for the purpose of illustration is shown a preferred embodiment of my invention and wherein:—

Figure 1 is an enlarged view of a place card constructed in accordance with my invention;

Figures 2, 3 and 4 are fragmentary views of the cards which will be held by the persons playing at the same table with the person holding the cards shown in Figure 1;

Figure 5 is a view of a slightly modified card having different means for designating the couples.

Referring now more particularly to the drawings, the cards 10 are provided with the usual scoring space 11 with two columns of indicia 12 and 13 suitably identified, as at 14 and 15, as representing the number of the game to be played and the table at which the game is to be played. The cards are provided in number equal to the number of players who will participate and upon the set of cards identifying indicia 12 correspond on each card while the indicia 13 are differently arranged upon each card.

Of the set of cards, the indicia 13 opposite a given indicia 12 are duplicated a number of times equal to the number of players who will play at a single table at each game, there being usually four duplications of the indicia 13. In the present instance, the illustration includes the four cards which will be held by the players playing at table #1 in the first game and it will be noted that the indicia 13 corresponding to the numeral (1) of the indicia 12 are (1) in each of the cards illustrated. The indicia 13 which are duplicated upon the four cards are arranged in pairs given identifying characteristics as by differently coloring the indicia 13 so that partners in play at the table may be positively and readily identified. In the present illustration, the indicia 13 followed by "x" are printed in red, as indicated by the legend upon the drawings while the remaining indicia 13 are printed in black. Of the four persons holding the cards bearing (1) as the indicia 13 corresponding to the first game, those whose indicia 13 are printed in the same color will play as partners. The card is preferably provided with a suitable legend 16 indicating the manner in which partners are determined. The cards of the set are furthermore preferably subdivided into lesser sets, one representing the male and the other the female contingent of the players and are suitably identified. This identification, indicated at 17, preferably takes the form of a number designating the number of tables for which the set has been prepared, this number being accompanied by a symbol 17ª designating the sex. This symbol in the present instance, is illustrated as an accompanying letter A or B and the cards of the section 6ᴬ will be distributed to the males and B to the female contingent or vice versa. Of the four cards bearing similar indicia 13 opposite a given game, No. 2 will be in each set 6ᴬ or 6ᴮ and of these two cards, the similar indicia 13 will be given different characteristics so that the players of the same sex will not be designated as partners.

In Figure 5, the arrangement of the cards is identical with that shown in Figures 1 to 4 with the exception of the fact that a card is here produced which is capable of use where the number of tables playing exceeds the number of games to be played. In this case, there is no possibility of the range of association which is possible where the number of tables is less than the number of games and for this reason, it is possible to constantly designate the couples by number as "Couple, No. 1" or "Couple, No. 2" and the card is provided with a symbol 18 for giving the couple number.

It will be obvious that the arrangement of the card, as hereinbefore set forth is capable of a certain range of change and modification. For example, it may be desirable that other means than that designated be provided for differentiating the cards of the set to provide sections for distribution to the sexes. An obvious modification is the provision of differently colored cords for attaching the usual scoring pencils. I, therefore, do not limit myself to the specific arrangement illustrated except as hereinafter claimed.

I claim:—

1. Game place indicating elements comprising a series of cards each having a column of indicia to denote the number of the game to be played and a second column of indicia each denoting a table and each placed opposite indicia representing the number of the game which shall be played at the table, the second mentioned indicia being duplicated opposite a given game indicia in the cards of the series a number of times equal to the number of players to be seated at the table indicated, cards having duplicated table indicia opposite a given game indicia being divided into groups characteristically designated by said table indicia to thereby designate the persons who are to play as partners.

2. Game place indicating elements comprising a series of cards characteristically divided into two sections representing the sexes of the players, each card having a column of indicia to denote the number of the game to be played and a second column of indicia each denoting a table and each placed opposite indicia representing the number of the game which shall be played at the table, the second mentioned indicia being duplicated opposite a given game indicia in the cards of the series a number of times equal to the number of players to be seated at the table indicated, cards having duplicated table indicia opposite a given game indicia being divided into groups characteristically designated by said table indicia to thereby designate the persons who are to play as partners, each group containing a card from each of said sections.

JOHN N. MINNICH.